United States Patent [19]

Coale

[11] Patent Number: 5,474,154
[45] Date of Patent: Dec. 12, 1995

[54] AIR BRAKES ADJUSTMENT INDICATOR FOR VEHICLES SUCH AS TRUCKS AND THE LIKE

[76] Inventor: Edward D. Coale, 848 Darlington Rd., Darlington, Md. 21034

[21] Appl. No.: 260,923

[22] Filed: Jun. 15, 1994

[51] Int. Cl.⁶ ................................................. F16D 66/00
[52] U.S. Cl. ..................... 188/1.11; 116/274; 340/454
[58] Field of Search ............................ 188/1.11, 196 R; 73/861.33, 861, 87, 132; 116/208, 273, 274; 340/453, 454

[56] References Cited

U.S. PATENT DOCUMENTS

| | | | |
|---|---|---|---|
| 4,033,607 | 7/1977 | Cameron | 188/1.11 X |
| 4,101,874 | 7/1978 | Denison et al. | 116/274 X |
| 4,201,974 | 5/1980 | Fima . | |
| 4,583,071 | 4/1986 | Sebalos et al. . | |
| 4,642,603 | 2/1987 | Martinez, Jr. . | |
| 4,749,063 | 6/1988 | Garrett et al. . | |
| 4,757,300 | 7/1988 | Sebalos . | |
| 4,776,438 | 10/1988 | Schandelmeier . | |
| 4,793,190 | 12/1988 | Chang | 116/274 X |
| 4,800,991 | 1/1989 | Miller | 116/208 X |
| 4,937,554 | 6/1990 | Herman . | |
| 5,178,092 | 1/1993 | Schedin . | |
| 5,253,735 | 10/1993 | Larson et al. . | |
| 5,285,190 | 2/1994 | Humphreys et al. . | |

*Primary Examiner*—Matthew C. Graham
*Assistant Examiner*—Lee W. Young
*Attorney, Agent, or Firm*—Shlesinger, Arkwright & Garvey

[57] ABSTRACT

A brake adjustment indicator for an air brake having a brake chamber, comprises a body including a cavity within, the body including a passageway having an inlet and an outlet communicating with the cavity, the inlet and outlet being adapted for connecting to an air line connected to the brake chamber such that pressurized air is routed through the cavity to turn the impeller whenever the air brake is activated; an impeller rotatably supported within the cavity; a sensor disposed adjacent the impeller for sensing the rotation of the impeller; and a display counter for counting and displaying the amount of rotation of the impeller which is indicative of the amount of air required to activate the air brake.

19 Claims, 2 Drawing Sheets

AIR BRAKES ADJUSTMENT INDICATOR FOR VEHICLES SUCH AS TRUCKS AND THE LIKE

FIELD OF THE INVENTION

The present invention generally relates to air brakes for trucks and the like and particularly to air brakes adjustment indicator that provides information to the user on the extent of wear and thus need of adjustment on air brakes on heavy vehicles such as trucks and the like.

BACKGROUND OF THE INVENTION

Air brakes for trucks and the like are activated by a treadle valve with a relatively short stroke that is not affected by the brake chamber displacement. Consequently, it is relatively difficult for drivers to sense from the brake pedal travel the extent of out of adjustment of the brakes. Brake adjustment is extremely important because the push rod force drops off rapidly once the push rod travel exceeds approximately two inches.

One way of determining brake adjustment is to measure the brake rod travel by marking the brake rod at the brake chamber exit point while it is in the most retracted position. The driver then applies the brakes while an assistant measures the brake rod travel to determine if it is within safety limits. Since the brake rod is only visible from underneath the vehicle and is not protected from road grime, one actually has to physically get underneath the vehicle and clean the brake rod before one can determine the amount of travel of the brake rod. Thus, the test is relatively cumbersome and inconvenient to perform, which typically leads to relatively infrequent and irregular testing to be done.

Therefore, there is a need for an indicator for air brakes for vehicles that determines in a convenient and accurate way the extent of out of adjustment of the brakes to insure that they remain in good operating condition.

OBJECTS AND SUMMARY OF THE INVENTION

It is an object of the present invention to provide a brake adjustment indicator for vehicles such as trucks and the like that provides relatively accurate information on the extent of out of adjustment of the brakes.

It is another object of the present invention to provide a brake adjustment indicator for vehicles such as trucks and the like that provides information on the extent of out of adjustment of the brakes within the driver's cab without requiring the driver to physically look at the brake actuator underneath the truck.

It is still another object of the present invention to provide a brake adjustment indicator for vehicles such as trucks and the like that allows the driver without assistance to check the brake operation and the proper connection of all pneumatic lines.

It is another object of the present invention to provide a brake adjustment indicator for vehicles such as trucks and the like that provides an indication of the amount of air needed to activate the brakes, which amount increases as the amount of travel of the brake rod increases, thereby providing feedback to the driver on the extent of out of adjustment of the brakes.

It is another object of the present invention to provide a brake adjustment indicator for vehicles such as trucks and the like that is relatively inexpensive to manufacture and relatively simple to install in existing trucks.

This and other objects of the present invention will become apparent from the following detailed description.

DETAILED DESCRIPTION OF THE INVENTION

Figure 1:
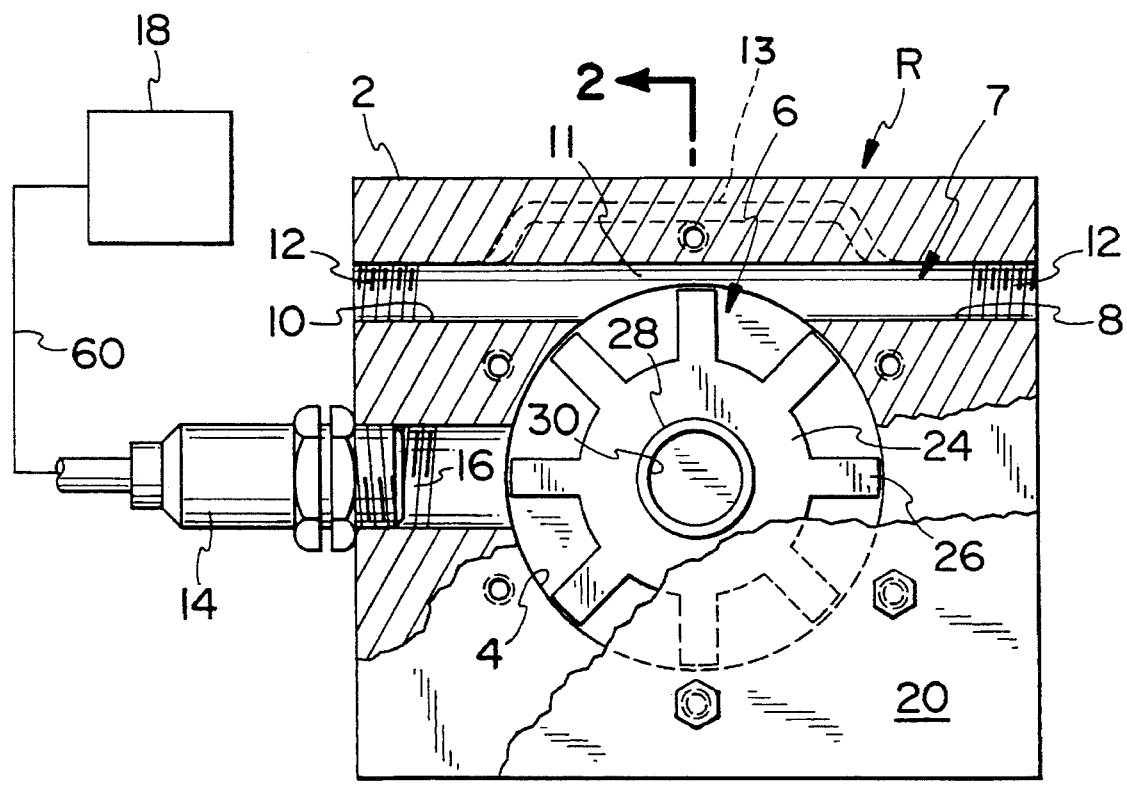
FIG. 1 is a partial cross-sectional view with portions broken away of a brake adjustment indicator in accordance with the present invention.
Figure 2:
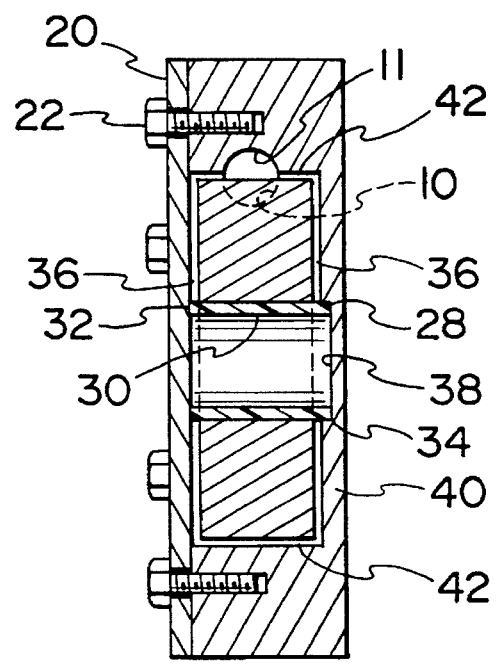
FIG. 2 is a cross-sectional view taken along line 2—2 of FIG. 1.

A brake adjustment indicator system R in accordance with the present invention is disclosed in FIG. 1. The indicator R includes a body or housing 2 with a circular recess 4 adapted to receive a paddle wheel or impeller 6. A passageway 7 with inlet 8 and outlet 10 communicates with the recess or cavity 4. A bypass portion 11 of the passageway 7 is advantageously offset into the body 2 such that air flow is permitted through the body 2 even if the paddle wheel 6 is frozen in place, as best shown in FIG. 2. The inlet 8 and outlet 10 each includes inner threads 12 for connecting to the air brake pneumatic line of the truck. The bypass portion 11 is configured to provide enough air to pass through and operate the brakes in case the paddle wheel 6 freezes. An alternative bypass 13 communicating with the inlet 8 and outlet 10 may be provided in the body 2 to permit pressurized air to pass through the body in the event of freeze-up of the impeller 6.

A sensor 14, such as a proximity switch, is secured to the body 2 in a threaded opening 16, as best shown in FIG. 1. The sensor 14 is adapted to generate a plurality of pulses when the paddle wheel 6 rotates. A display counter 18 is connected to the sensor 14 for picking up, counting and displaying the pulses generated by the sensor 14. The display counter 18 may include a microprocessor for processing the pulse train generated by the sensor 14.

A cover 20 is secured to the body 2 by means of bolts 22 or other standard means in a watertight manner, as best shown in FIGS. 1 and 2.

The body 2 may be made from metal, plastic or other suitable materials.

The paddle wheel 6 has hub 24 from which a plurality of paddles 26 extend. A sleeve bearing 28 is press fitted into a central opening 30 in the hub 24. The sleeve bearing is a conventional plastic bushing impregnated with a lubricant. The sleeve 30 has end portions 32 and 34 that extend beyond the width of the hub 24 and the paddles 26 to provide a small gap 36 between the body 2 and the paddle wheel 6 and the cover 20 to permit interference-free rotation of the paddle wheel 6 within the recess 4. A central recess or depression 38 on the bottom wall 40 of the recess 4 rotatably receives the end portion 34 of the sleeve 28.

The overall diameter of the paddle wheel 6 is slightly smaller than the diameter of the circular recess 4 to provide a small rotational gap 42, as best shown in FIG. 2.

The paddles 26 are preferably made of a material that is compatible with the sensor 14 such each pass of each paddle 26 across the sensor 14 is effective to generate a pulse. In the embodiment shown for the paddle 6, it will be understood that one revolution will generate six pulses, two revolutions 12 pulses and so-forth. Thus, the number of pulses is indicative of the number of revolutions of the paddle 6.

The paddle wheel 6 may be formed from metal, plastic or other suitable materials. If made from plastic, the paddles 26 will be advantageously coated with a metallic paint or similar coating that will be picked up by sensor 14.

Figure 3:
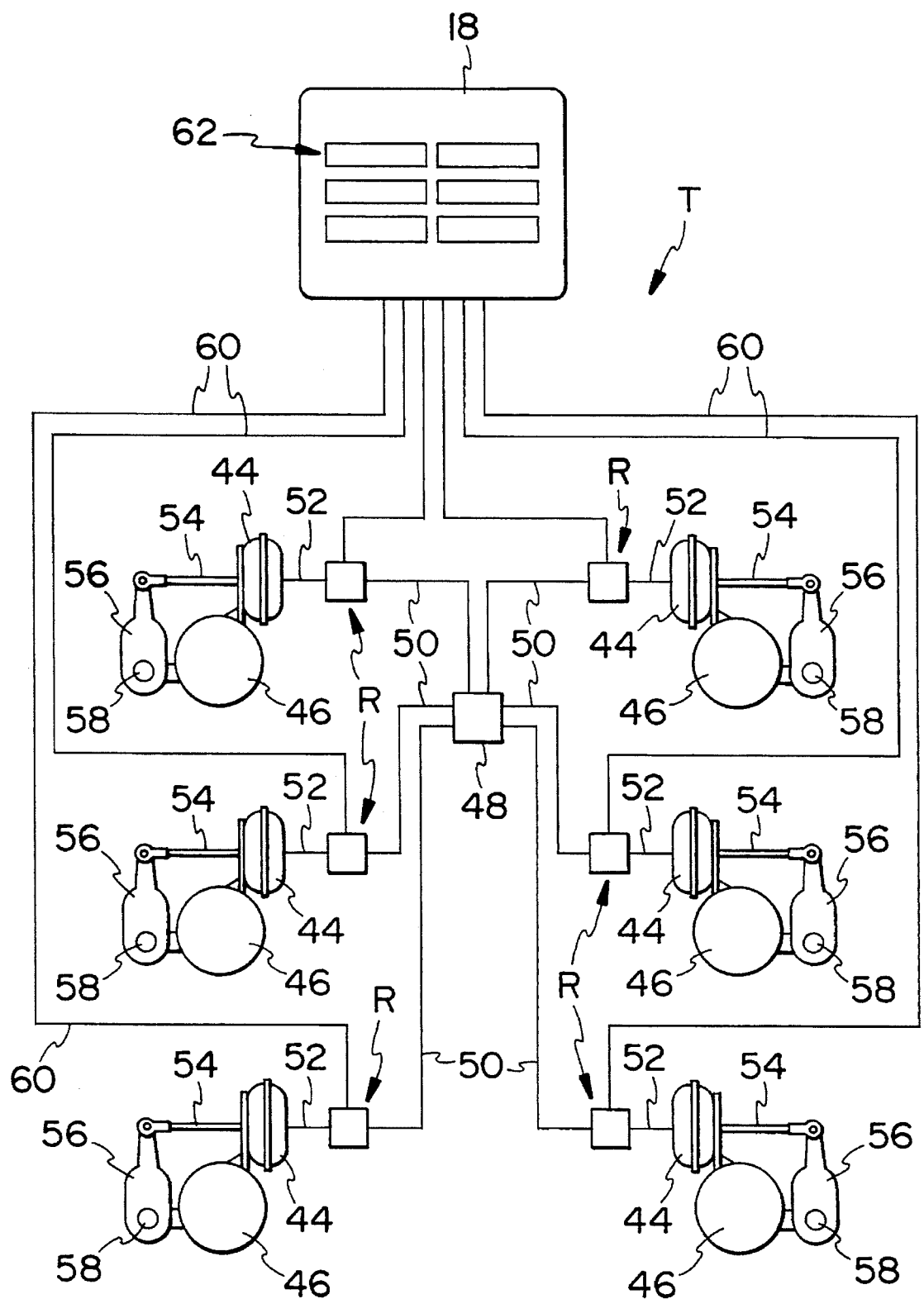
FIG. 3 is a schematic diagram of an air brake system used in vehicles such as trucks or the like incorporating the brake adjustment indicator of FIG. 1.

An air brake system T for a vehicle such as a truck or the like using the indicator R in accordance with the present invention is disclosed in FIG. 3. Although the air brake system T is shown for a six-wheeled vehicle with a brake chamber 44 for each wheel, it should be understood that the air brake system T is equally applicable to a four-wheel vehicle or the like.

The air brake system T comprises a plurality of conventional brake chambers 44 secured to respective wheel axle 46. Each brake chamber 44 is connected to a source 48 of pressurized air by means of pneumatic lines 50 and 52. A diaphragm (not shown) disposed within the chamber 44 is operably connected to a brake rod 54 by known means such that when pressurized air is introduced into the brake chamber 44, the brake rod 54 is extended outwardly. Each brake rod 54 is pivotably connected to a brake arm 56 which is journaled to a cam shaft 58. The extension of each brake rod 54 causes rotation of the respective cam shaft 58 whose rotation is effective by known means to activate the friction members (not shown), such as brake shoes or brake pads, thereby to stop the vehicle. A compression spring (not shown) within each brake chamber 44 causes the brake rod 54 to retract back toward the brake chamber 44 after the pressurized air is cut off.

The brake adjustment indicator R is disposed between the respective brake chamber 44 and the pressurized air source 48 such that pressurized air flow to the brake chamber 44 is routed through the indicator R. Each indicator R is secured underneath the vehicle by standard means (not shown) know to a person of ordinary skill in the art. Each inlet 8 and outlet 10 of the indicator R are connected to the pneumatic lines 50 and 52, respectively, as best shown in FIG. 3.

Each indicator R is connected to the display counter 18 by means of wires 60 through the respective sensor 14. Each brake chamber 44 is assigned a specific display panel, generally indicated at 62, which may be a digital readout, LED, etc., to indicate the extent of travel of each brake rod 54 and therefore the extent of out of adjustment of the brake shoes or pads. A single display panel with a selector key to select a specific sensor may also be employed.

The display counter 18 is advantageously located within the driver's compartment for immediate visual access by the driver, such as on the dashboard.

In operation, the driver performs a pretrip check on the brakes by pressing on the brake pedal. This is normally done while the truck is safely parked in a parking lot or on the side of the road. When the driver presses on the brake pedal, pressurized air is released from the source 48 and routed to each brake chamber 44 via each indicator R which is connected in series to the pneumatic lines 50 and 52. Pressurized air entering each inlet 8 impinges on the paddles 26, causing the paddle wheel 6 to turn and exhaust the pressurized air through each outlet 10. The rotation of the paddle wheel 6 is picked up by the sensor 14, generating a plurality of pulses indicative of the amount of rotation of the paddle wheel 6. The pulse train is transmitted to the display counter 18 by wire 60 to provide a number equal to the number of times the paddles 26 pass the sensor 14. The amount of travel of the brake rod 54 increases as the brake pad or brake shoe lining wears from use. As the air brake stroke increases, the volume of air required to activate the brakes increases. Thus, it takes more air to extend the brake rod 54 a greater distance than at a shorter distance, requiring more air to pass through the indicator R. The volume of air required to activate the brakes is provided by the number of pulses generated by the sensor 14 as the paddle wheel 6 rotates. An increasing pulse count indicates increasing amount of air to activate the brakes, indicating increasing wear of the brake friction members.

A person of ordinary skill in the art can determine the pulse count required to activate brakes that are in good repair or properly adjusted. This amount is the calibrated or standard level against which subsequent readings are compared to provide an indication of extent of out adjustment of the brakes. When the pulse count exceeds the standard or calibrated level, the driver can determine from the readout which specific brake is out of adjustment, advantageously providing the driver with information on which to take appropriate action without ever having to go underneath the vehicle.

Although the display counter 18 is configured to provide the number of pulses equal to the number of the paddles 26 that pass by the sensor 14, it should be understood to a person of ordinary in the art that the display counter 18 may also be configured to display the number of revolutions of the paddle wheel 6, the amount of air passing through the body 2, or some other number related to the rotation of the paddle wheel 6 or the air passing through the body 2.

Instead of a readout, the display counter 18 can be set up with a plurality of lamps, each lamp being tied in to a specific brake chamber. A lamp can be set up to light up when pulse count generated by the sensor 14 in response to the rotating paddle wheel 6 exceeds the standard level for a brake in good repair.

When the paddle wheel 6 freezes for some reasons, such as water getting into the recess 4 and freezing, the sleeve 28 wearing out and catching the body 2, etc., the pressurized air can still advantageously get to the brake chamber 44 through the bypass portion 11. The sensor will not generate any pulses, since the paddle wheel 6 will not be rotating, advantageously alerting the driver of a malfunction. However, the affected brakes will continue to function as before.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

I claim:

1. A brake adjustment indicator for an air brake having a brake chamber, comprising:

a) a body including a cavity within;

b) an impeller rotatably supported within said cavity;

c) said body including a passageway including an inlet and an outlet communicating with said cavity, said inlet and outlet being adapted for connecting to an air line connected to the brake chamber such that pressurized air is routed through said cavity to turn said impeller whenever the air brake is activated;

d) a sensor disposed adjacent said impeller for sensing the rotation of said impeller; and e) a display counter for counting and displaying the amount of rotation of said impeller which is indicative of the amount of air required to activate the air brake.

2. A brake adjustment indicator as in claim 1, wherein:
a) said passageway is disposed in a straight line from one side to the opposite side of said body.

3. A brake adjustment indicator as in claim 1, wherein:
a) said cavity is circular when viewed in an axis of rotation of said impeller; and
b) said passageway is disposed tangentially to said cavity.

4. A brake adjustment indicator as in claim 1, wherein:
a) said body includes a bypass communicating with said inlet and outlet for permitting pressurized air to pass through said body in the event of freeze-up of said impeller.

5. A brake adjustment indicator as in claim 1, wherein:
a) said passageway includes a bypass portion for permitting pressurized air to pass through said body in the event of freeze-up of said impeller.

6. A brake adjustment indicator as in claim 5, wherein:
a) said cavity includes a wall; and
b) said passageway bypass portion is recessed into said wall.

7. A brake adjustment indicator as in claim 1, wherein:
a) said impeller includes a hub and a plurality of arms extending therefrom.

8. A brake adjustment indicator as in claim 7, wherein:
a) said hub includes a central opening; and
b) said impeller includes a sleeve secured in said opening;
c) said sleeve includes first and second end portions extending beyond said hub;
d) said first end portion is rotatably supported in a depression in said cavity; and
e) said second end portion abuts a wall opposite said depression.

9. A brake adjustment indicator as in claim 1, wherein:
a) said inlet and outlet are disposed in line.

10. A brake adjustment indicator for an air brake having a brake chamber, comprising:
a) a body having a cavity within;
b) an impeller rotatably supported within said cavity;
c) said body including a passageway including an inlet and an outlet communicating with said cavity, said inlet and outlet being adapted for connecting to an air line connected to the brake chamber such that pressurized air is routed through said cavity to turn said impeller whenever the air brake is activated;
d) said passageway including a bypass portion;
e) a sensor secured to said body and adjacent said impeller for sensing the rotation of said impeller; and
f) a display counter for displaying data indicative of the amount of rotation of said impeller, thereby to indicate the amount of air required to activate the air brake and the extent of adjustment of the brakes.

11. A brake adjustment indicator as in claim 10, wherein:
a) said cavity is defined by a circular vertical wall and a pair of opposed side walls; and
b) said bypass portion is disposed in said vertical wall.

12. An air brake, comprising:
a brake chamber connected to a source of pressurized air;
b) a housing and an impeller disposed within said housing;
c) said housing is connected between said brake chamber and the source of pressurized air such that pressurized air is routed through said housing to turn said impeller whenever said air brake is activated;
d) a sensor for sensing the rotation of said impeller required to engage the air brake; and
e) a display counter for counting and displaying the amount of rotation of said impeller thereby to provide an indication of the amount of air required to activate the air brake.

13. A brake adjustment indicator as in claim 12, wherein:
a) said housing includes a passageway operably associated with said impeller disposed from one side to the opposite side of said housing.

14. A brake adjustment indicator as in claim 13, wherein:
a) said housing includes a cavity which is circular when viewed in an axis of rotation of said impeller; and
b) said passageway is disposed tangentially to said cavity.

15. A brake adjustment indicator as in claim 13, wherein:
a) said housing includes a bypass communicating with said passageway for permitting pressurized air to pass through said housing in the event of freeze-up of said impeller.

16. A brake adjustment indicator as in claim 13 wherein:
a) said passageway includes a bypass portion for permitting pressurized air to pass through said housing in the event of freeze-up of said impeller.

17. A brake adjustment indicator as in claim 14 wherein:
a) said cavity includes a wall; and
b) said passageway in cross-section is partially recessed into said wall.

18. A process for determining the extent of adjustment of an air brake, comprising:
a) activating the air brake;
b) providing an indication of the amount of air required to activate the air brake by measuring the amount of rotation of a wheel caused to turn whenever the air brake is activated; and
c) comparing the amount to a standard level.

19. A process as in claim 18, wherein:
a) said step of measuring the amount of rotation of the wheel includes the step of providing a pulse generator responsive to the rotation of the wheel; and
b) adding the number of pulses until the brake is engaged.

* * * * *